United States Patent Office 3,496,267
Patented Feb. 17, 1970

3,496,267
PHARMACEUTICAL COMPOSITIONS CONTAINING LYOPHILIZED CARDIAC MITOCHONDRIA
Roger Jean Vendel, Paris, France, assignor to Egema, S.A., Paris, France
No Drawing. Filed Aug. 9, 1965, Ser. No. 478,423
Claims priority, application France, Aug. 31, 1964, 986,654
Int. Cl. A61k 17/00
U.S. Cl. 424—95                                    20 Claims This invention relates to a novel drug consisting mainly of mitochondria.

As already known, mitochondria are granular protoplasmic inclusions found in all living cells. The importance of chondriome and, more particularly, of mitochondria, which have a capital function in the breathing mechanisms observed at the cell level and also in the enzymatic mechanisms observed at that level, is now universally acknowledged.

More particularly, mitochondria of cardiac cells are subcellular particles measuring from 1 to $4\mu$; their composition averages 35% lipids and 65% proteids. They include notably diphosphopyridine nucleotide (DPN), flavoproteins, ubiquinones, cytochromes $b$, $c$, $c_1$, $a$ and $a_3$. As a main seat of reactions participating in the citric oxydative cycle and to coupled phosphorylations, mitochondria contain all the soluble enzymes insuring the combustion of the pyruvic acid and the structured enzymes of the electron transport chains and of the phosphorylations connected thereto.

The essential function of mitochondria is to reserve the energy developed by breathing, in the form of phosphate linkage energy in the ATP molecules.

The applicant aims at isolating mitochondria from the cells containing them while preserving their tissue oxygenation properties with a view to utilize them as drugs capable of promoting exchanges at the cells level and thus improving the general condition of the patients treated therewith.

(I) METHOD OF PREPARING THE NEW DRUG ACCORDING TO THIS INVENTION

Lyophilic mitochondria of cardiac origin are prepared as follows.

A heart taken from a freshly slaughtered animal, such as a horse, a calf, an ox, etc. is freed of the fat, large vessels and aponeuroses attached thereto. Then the heart is cut up into pieces, frozen and subsequently crushed to a fine particle size by means of a cellular grinder in which the cellular walls are destroyed. To the resulting mash there is added a solution consisting of saccharose having a 0.25 m. concentration and of $PO_4HK_2$ having a 0.01 m. concentration, in an amount equal to 4 or 5 times the volume of mash obtained; the pH is adjusted at a value of 7.2 to 7.4, then the mix is centrifuged at low temperature and low speed to eliminate cells, nuclei and membranes. The supernatant is centrifuged at high speed (10,000G) and at low temperature, thus causing the mitochondria to settle. The supernatant is eliminated, and the mitochondria are washed and lyophilized.

(II) STUDY OF THE PHARMACOLOGICAL PROPERTIES OF THE NEW DRUG ACCORDING TO THE INVENTION

The study of the pharmacological properties of the novel drug according to this invention evidences properties of oxygenation and improvement in the general condition of patients which characterize mitochondria preparations.

An experiment was conducted on an eleven-year old griffon bitch suffering from cough and getting out of breath after the least exercise, the animal displaying a considerable but scanty running attended by epiphora. The conjunctive is pale, the respiration rather fast and of abdominal character.

The precordial shock is strong and irregular, the pulse weak and irregular, 80 per minute. The palpation and pressure of the trachea starts a dry, fitful cough in the auscultation of lungs a strong bronchial respiration is heard, and the auscultation of heart shows an irregular rhythm irrelevant to the breathing. The first noise is of low intensity and characterized by a muffled timbre, and the second one is strong and clear. During the first examination a low-intensity cystolic breath of functional character is isolated on hearing. The electrocardiogram shows an abnormally developed inotropic function, in D2 and VF, with a QRS complex which is never isodynamic. The chronotropic function is very much impaired due to a sinusoid, non-respiratory arrhythmia.

To the bitch there is administered during five days, by the oral route, the content of a bottle containing lyophilized cardiac mitochondria corresponding to one gram of fresh ox heart.

After this treatment the pulse is more accentuated and the rhythm has become considerably more regular. The inotropic function has been reduced. The amplitude is lowered towards normal values; the QRS complex is more regular. The T-wave has nearly disappeared. The cardiac rhythm has been accelerated to 120 (positive chronotropic function). The conductibility, which was normal before the treatment, is improved, the bathmetropic function is improved, the exaggerated sinusoid arrhythmia is becoming more regular.

The table hereunder shows by way of comparison the results obtained after five takings of mitochondria, by reason of a daily quantity equivalent to 1 gram of fresh ox heart, in comparison with the initial clinical position.

Before treatment, Rhythm=90

| Amplitude | P | Q | R | S | T | Duration |
|---|---|---|---|---|---|---|
| $D_1$ | 0.10 | −0.05 | 1.60–1.25 |  | 0.20 | P 0.04. |
| $D_2$ | 0.10 |  | 2.60–2.80 | −0.10 | 0.45 | PQ 0.10. |
| $D_3$ |  |  | 1.40–1.65 | −0.30 | 0.25 | QRS 0.04. |
| VR | 0.10 | 0.05 | 1.9–2.3 |  | 9.35 | ST 0.15. |
| VL | 0.05 | −0.05 | 1–1.40 |  | 0.10 | T 0.08. |
| VF | 0.05 |  | 2.30–2.60 | −0.05 | 0.30 | TP 0.05, 0.6. |

1 hour after the 5th taking of mitochondria (1 gram per os), Rhythm=112

| | P | Q | R | S | T | Duration |
|---|---|---|---|---|---|---|
| $D_1$ | 0.05 | −0.05 | 1.35 |  | 0.05 | P 0.04. |
| $D_2$ | 0.10 |  | 2.30 | −0.10 | 0.05 | PQ 0.12. |
| $D_3$ | 0.05 |  | 1.50 | −0.20 | 0.10 | QRS 0.04. |
| VR | −0.10 |  | 1.80 |  | −0.10 | ST 0.12. |
| VL |  | 1.10 | 0.30 |  | −0.05 | T 0.06. |
| VF | 0.05 |  | 1.40 | −0.20 | 0.10 | TP 0.40–0.70. |

(III) RESULTS OF CLINICAL EXPERIMENTS

The clinical test reported hereinafter evidences the rapid and efficient action exerted by the mitochondria drug constituting the subject-matter of the present invention on the functional capacity.

Subject: A 62-year old man.

This patient had already suffered from two heart attacks, the first one on account of a left-hand ventricular insufficiency having satisfactorily reacted to K-strophantine, the second one on account of a global insufficiency attended by tachyarrhythmia, oliguria and hepatomegalia, treated by the administration of digitalin.

A permanent digitalin treatment (fifteen drops per day during four successive days every week) had been instituted.

After four months of evolution, the following clinical table was recorded:

Poor functional tolerance: the observed dyspnoea was moderate at rest but definitely accentuated after an effort;
Pulse: 92/min. at rest;
Cardiac auscultation: no breath, normal noises, except for a discrete clangorous burst of the 2nd noise at the 2nd E.I.D.;
Practically normal pulmonary auscultation (except for a few humid rattles in both pulmonary regions);
Arterial pressure: 19/11;
Electrocardiogram: small systolic left-hand ventricular overload, sinusoid arrhytmia;
Normal liver and spleen;
Discrete oedema at the ankles (which was more accentuated in the evening).

It seems that in spite of the digitalin treatment a certain aggravation occurred, as if digitalis was no more capable of efficiently controlling the evolution.

The administration of digitalin as well as other treatments (pheno-barbital, theophyllin) are discontinued, and a treatment utilizing the mitochondria preparation according to the present invention is instituted at the rate of 3 lyophilized ampoules per day, by the oral route (each ampoule corresponding to about 1 gram of fresh heart).

After a two-week treatment another examination is carried out which gives the following results:

No dyspnoea in the rest condition, better tolerance to effort (very moderate breathlessness after an effort greater than before). This is completed by an improved general condition on which the patient insists;
Arterial pressure: 18/10;
Regular pulse: 88;
A light malleolar oedema persists (which is not more pronounced in the evening).

Considering this definite improvement, especially in connection with the functional capacity and the general condition, a novel digitalin treatment is started (by reason of only 10 drops during 4 successive days per week).

A novel examination carried out five days later gives the following results:

Regular pulse at 78;
No dyspnoea;
Ankles are free of any infiltration.

The decision is taken to institute each month, during three months, a treatment comprising medicaments including the new mitochondria drug according to this invention during one week;
digitalin during the two next weeks;
a therapeutical rest during the fourth week of the month.

From the foregoing it appears that in addition to the improvement obtained with this novel mitochondria drug according to the present invention in the functional capacity, this drug permits of re-sensibilizing the myocard to the action of digitalin at a dose inferior to the doses which had to be administered beforehand.

(IV) PRESCRIPTION AND ADMINISTRATION

The novel drug according to this invention, consisting of, or based on, mitochondria, is adequate notably for all cases in which it is desired to improve the respiratory exchanges at the cell level notably at the level of the cardiac cells which need oxygen and energy. The prescription of the novel drug according to this invention is particularly adequate in the following cases:

cardiac deficiencies by annoxia or muscular fatigue;
senile heart or aged persons heart;
myocardial infarct; in conjunction with conventional medical treatments (anticoagulants, etc. . . .)
cardiac fatigability;
deficiencies in the general condition;

however, the above list should not be construed as limiting the cases in which the novel mitochondria drug of this invention may be prescribed for treating different deficiencies and insufficiencies.

The novel medicament according to this invention may be administered in all its forms capable of being assimilated by the organism at doses varying as a function of the trouble to be contented thereby and also of the intensity of this trouble.

Here are a few examples of particularly advantageous forms of administration of the novel drug of this invention:

Drinkable lyophilized ampoules containing the equivalent of 5 to 10 grams of fresh heat;
gel ovules or capsules to be absorbed by the oral route, containing the equivalent of 5 to 10 grams of fresh heart;
tablets containing the equivalent of 1 to 10 grams of fresh heart.

The present invention puts at the disposal of the practitioner a selected drug since mitochondria are formations constituting the seat or respiratory exchanges as well as of certain enzymatic mechanisms in the cell, both clinical and pharmacological studies having evidenced the fact that the functions of these formations are preserved after isolating the cell.

What I claim is:
1. A pharmaceutical composition which contains as an essential ingredient lyophilized mitochondria in oral dosage form, the mitochondria being from heart cells of a freshly-slaughtered mammal.
2. A composition according to claim 1 wherein the mitochondria is in unit dosage form.
3. Oral administration of a composition according to claim 1 to improve respiratory exchanges at the cell level, said administration being to a host deficient in such respiratory exchanges.
4. Oral administration of a composition according to claim 1 to a host suffering from cardiac insufficiency.
5. Oral administration of a composition according to claim 1 to a host suffering from anoxia cardiac deficiency.
6. Oral administration of a composition according to claim 1 to a host suffering from cardiac muscle fatigue.
7. Oral administration of a composition according to claim 1 to a host suffering from senile heart.
8. Oral administration of a composition according to claim 1 to a host suffering from cardiac fatigability.
9. A composition according to claim 1 wherein the mammal heart is ox heart.
10. Oral administration of a composition according to claim 9 to a host suffering from cardiac insufficiency.
11. Oral administration of a composition according to claim 9 to a host suffering from anoxia cardiac deficiency.
12. Oral administration of a composition according to claim 9 to a host suffering from cardiac muscle fatigue.
13. Oral administration of a composition according to claim 9 to a host suffering from senile heart.
14. Oral administration of a composition according to claim 9 to a host suffering from cardiac fatigability.
15. A composition according to claim 1 containing mitochondria equivalent to that in from 1 to 10 grams of fresh heart.
16. A process for improving respiratory exchanges at the cell level which comprises orally administering a composition according to claim 15.
17. Lyophilized cardiac mitochondria, the mitochondria of which are heart cell mitochondria of a freshly-slaughtered mammal.

18. Lyophilized ox heart mitochondria according to claim 17.

19. Lyophilized calf heart mitochondria according to claim 17.

20. Lyophilized horse heart mitochondria according to claim 17.

References Cited

Chemical Abstracts I, vol. 55, entry 4791e, 1961, citing Laudahn et al., Arzneimittel-Forsch, 10, 781–5(1960).

Chemical Abstracts II, vol. 55, entry 9680c, 1961, citing Laudhan et al., Arzneimittel-Forsch, 10, 978–85 (1960).

Greiff et al.: Biochim. et Biophys. Acta, 50 (1961), 233–242.

Hosphelhorn et al.: Biochim. et Biophys. Acta, 28 (1958), 261–268.

Schwartz et al., Biochim. et Biophys. Acta, 44 (1960), 590–592.

Campagnari et al.: Journal of Biological Chemistry, vol. 238, pp. 1628–1633, May 1963.

Doeg et al.: Biochimica Biophysica Acta, vol. 41, pp. 491–497, 1960.

RICHARD L. HUFF, Primary Examiner